US010350855B2

(12) United States Patent
Kinzelmann et al.

(10) Patent No.: US 10,350,855 B2
(45) Date of Patent: Jul. 16, 2019

(54) METHOD FOR ADHESIVELY BONDING TWO FILM-SHAPED SUBSTRATES

(71) Applicant: Henkel AG & Co. KGaA, Duesseldorf (DE)

(72) Inventors: Hans-Georg Kinzelmann, Pulheim (DE); Michael Gierlings, Hilden (DE)

(73) Assignee: HENKEL AG & CO. KGAA, Dusseldorf (DE)

( * ) Notice: Subject to any disclaimer, the term of this patent is extended or adjusted under 35 U.S.C. 154(b) by 28 days.

(21) Appl. No.: 15/436,908

(22) Filed: Feb. 20, 2017

(65) Prior Publication Data
US 2017/0203543 A1    Jul. 20, 2017

Related U.S. Application Data

(63) Continuation of application No. PCT/EP2015/069100, filed on Aug. 20, 2015.

(30) Foreign Application Priority Data

Aug. 21, 2014  (DE) .................... 10 2014 216 633

(51) Int. Cl.
| | | |
|---|---|---|
| *B32B 7/12* | (2006.01) | |
| *B32B 27/08* | (2006.01) | |
| *B32B 27/32* | (2006.01) | |
| *B32B 37/00* | (2006.01) | |
| *B32B 37/12* | (2006.01) | |
| *B32B 38/00* | (2006.01) | |
| *B32B 38/18* | (2006.01) | |
| *B32B 15/08* | (2006.01) | |
| *B32B 15/18* | (2006.01) | |
| *B32B 15/20* | (2006.01) | |
| *B32B 21/08* | (2006.01) | |
| *B32B 27/10* | (2006.01) | |
| *B32B 27/30* | (2006.01) | |
| *B32B 27/34* | (2006.01) | |
| *B32B 27/36* | (2006.01) | |
| *B32B 37/10* | (2006.01) | |

(52) U.S. Cl.
CPC ............... *B32B 7/12* (2013.01); *B32B 15/08* (2013.01); *B32B 15/18* (2013.01); *B32B 15/20* (2013.01); *B32B 21/08* (2013.01); *B32B 27/08* (2013.01); *B32B 27/10* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 37/0007* (2013.01); *B32B 37/0053* (2013.01); *B32B 37/10* (2013.01); *B32B 37/12* (2013.01); *B32B 38/0036* (2013.01); *B32B 38/18* (2013.01); *B32B 2270/00* (2013.01); *B32B 2307/546* (2013.01); *B32B 2405/00* (2013.01)

(58) Field of Classification Search
CPC .. B32B 7/02; B32B 7/10; B32B 15/08; B32B 115/18; B32B 15/20; B32B 21/08; B32B 27/08; B32B 27/10; B32B 27/302; B32B 27/304; B32B 27/308; B32B 27/32; B32B 27/34; B32B 27/36; B32B 37/12; B32B 38/0036; B32B 37/0053; B32B 2270/00
USPC .......................................................... 428/457
See application file for complete search history.

(56) References Cited

U.S. PATENT DOCUMENTS

| | | | | |
|---|---|---|---|---|
| 3,616,010 A | * | 10/1971 | Dunholter | ............. B31F 1/2804 156/210 |
| 5,250,610 A | * | 10/1993 | Hansel | ............... C08G 18/0823 428/423.1 |
| 2008/0000581 A1 | * | 1/2008 | Nison | ....................... B32B 5/18 156/272.2 |
| 2015/0140307 A1 | | 5/2015 | Kinzelmann et al. | |

FOREIGN PATENT DOCUMENTS

| | | |
|---|---|---|
| CN | 101173418 A | 5/2008 |
| CN | 102963101 A | 3/2013 |
| CN | 103538329 A | 1/2014 |
| DE | 102005028661 A1 | 12/2006 |
| NL | 1030609 | 6/2007 |
| WO | 2007017007 A1 | 2/2007 |
| WO | 2008144169 A2 | 11/2008 |
| WO | 2014019891 A1 | 2/2014 |

OTHER PUBLICATIONS

Database CA (Online) Chemical Abstracts Service, Columbus, Ohio, US, Feb. 27. 2014, Zhangjiagang Changtai Automotive Trims Materials Co., Ltd., Peop. Rep. China: "Method for producing polyurethane multilayer composite plate for automotive ceiling".
First Seach based on Chinese Application No. 2015800448260 (2 pages) dated Jun. 13, 2018 (for reference purpose only).
Chinese Office Action based on application No. 201580044826.0 (4 pages) dated Feb. 3, 2019 including the Chinese Search Report (2 pages) dated Jan. 28, 2019 for (reference purpose only).

\* cited by examiner

*Primary Examiner* — Hui H Chin
(74) *Attorney, Agent, or Firm* — Viering Jentschura & Partner MBB

(57) ABSTRACT

The invention relates to: a method for adhesively bonding two substrates, in which a first substrate, which contains a thermoplastic, is transported by way of at least one supporting conveyor belt through a heating zone in which the surface of said substrate is softened, and then the second substrate, which has an adhesive layer, is laminated onto the softened surface of the first substrate and pressed together therewith; a composite body obtainable in this manner, in which the two substrates are bonded by a flexible, thin adhesive layer; and a device for adhesively bonding these two substrates by means of the described method.

16 Claims, 3 Drawing Sheets

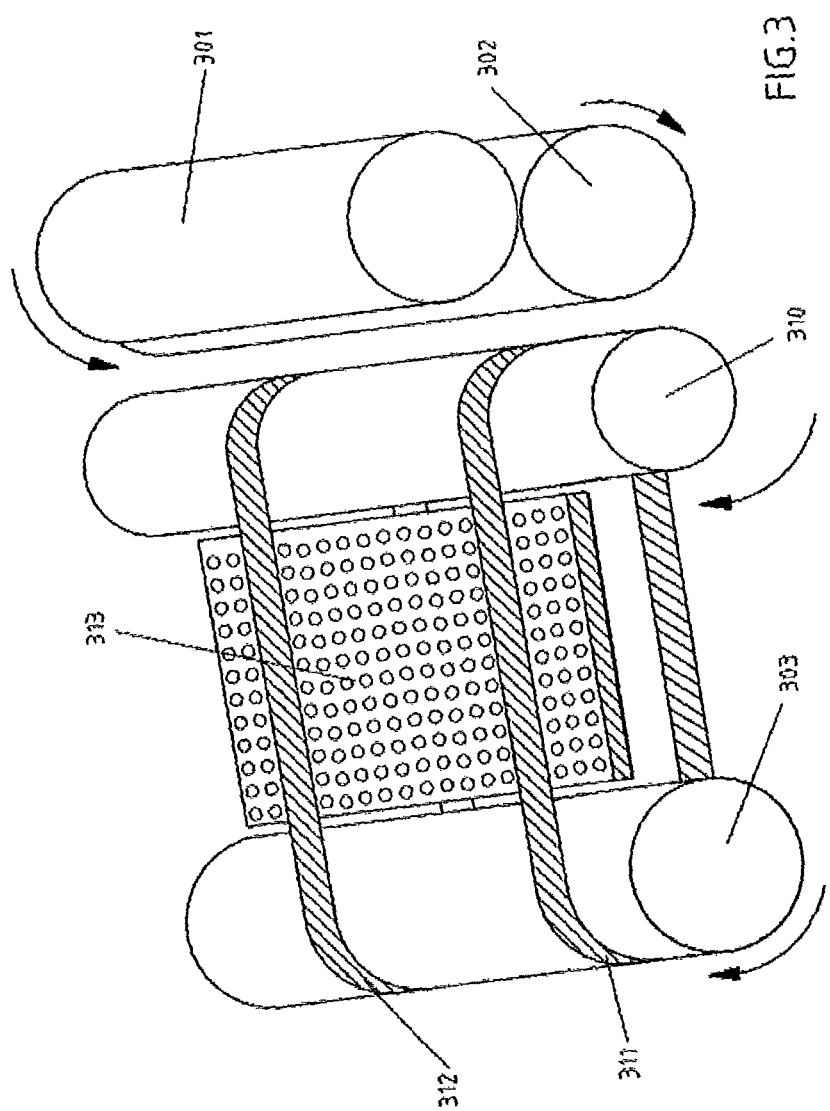

METHOD FOR ADHESIVELY BONDING TWO FILM-SHAPED SUBSTRATES

The present invention relates to: a method for adhesively bonding two substrates, wherein one substrate contains a thermoplastic and the bonding adhesive layer is thin; a composite body obtainable in this manner, in which the two substrates are bonded by a flexible, thin adhesive layer; and a device for adhesively bonding these two substrates.

A variety of methods for adhesively bonding substrates wherein a wide variety of adhesives are used to bond the substrates are known in the prior art. Optimally bonding the substrates to one another requires completely covering the surfaces of the substrates with the adhesive used. Should too little adhesive be used, the substrates will not be completely bonded to one another, and the resulting product tends to end up delaminating. Moreover, when too little adhesive is used, air bubbles can be trapped during the process; such air bubbles are visually perceptible in resulting transparent composite bodies, and are undesirable and moreover reduce the quality of the adhesive bonding. To reduce the amount of adhesive used and reduce the costs associated therewith, and additionally to ensure a full-surface adhesive bonding, it is advantageous for the substrates to have smooth surfaces, in particular, with large-area substrates such as films. Therefore, with substrates to be adhesively bonded that comprise thermoplastics, the surface is smoothed prior to the adhesive bonding, for example, by the application of heat. Substrates that have rough surfaces, in contrast thereto, enclose a greater cavity space and require a greater amount of adhesive during adhesive bonding. During the heating process, however, the heated substrate may be deformed, in particular, stretched, so that the resulting composite body is twisted and distorted and thus no longer has the desired condition.

The present invention therefore addresses the problem of providing a composite body comprising a film-shaped substrate containing at least one thermoplastic, and another substrate, wherein the substrates are adhesively bonded to one another over the entire surface area with a small amount of adhesive, and the composite body is also not deformed.

It has now surprisingly been found that a composite body thus produced is not deformed when, in the production process, a film-shaped substrate that is a component of the composite body and contains at least one thermoplastic is supported by means of at least one conveyor belt while being heated.

The present invention is therefore directed in a first aspect toward a method for adhesively bonding two substrates, comprising:
(i) transporting a first film-shaped substrate containing at least one thermoplastic by means of at least one supporting conveyor belt through a heating zone in which the substrate is heated so that the surface of the first substrate is transformed into a softened state;
(ii) bringing the first substrate together with a second substrate, wherein the second substrate has been coated with an adhesive with a coating weight of 0.01 to 4 $g/m^2$, preferably 0.01 to 1.5 $g/m^2$, preferably 0.01 to 1 $g/m^2$, especially preferably 0.01 to 0.7 $g/m^2$, during and/or immediately after, preferably immediately after, the heating; and
(iii) adhesively bonding the two substrates by pressure.

In another aspect, the present invention relates to a composite body obtainable by means of a method such as is described herein.

Finally, the present invention is directed in another aspect toward a device for adhesively bonding a first substrate and a second substrate, comprising:
(i) at least one supporting conveyor belt, in order to transport a first substrate;
(ii) a heating device, in order to soften the surface of the first substrate having been transported by means of the at least one conveyor belt; and
(iii) a roller assembly, in order to bring together and adhesively bond the softened first substrate with the second substrate.

These and further aspects, features, and advantages of the invention become apparent to a person skilled in the art when studying the following detailed description and claims. Every feature from one aspect of the present invention may be used in any other aspect of the invention. Moreover, it shall be readily understood that the examples contained herein are intended to describe and illustrate the invention, but do not limit the same, and in particular the invention is not limited to these examples. All percentage information is percent by weight, unless indicated otherwise. Numerical ranges indicated in the format "from x to y" include the mentioned values. If several preferred numerical ranges are indicated in this format, it shall be readily understood that all ranges resulting from the combination of the different end points are likewise covered.

"At least one", as used herein, refers to one or more, for example, one, two, three, four, five, six, seven, eight, nine, or more. In the context of components of the compositions described herein, this information refers not to the absolute amount of molecules, but rather to the type of the component. "At least one thermoplastic" therefore signifies, for example, one or more different thermoplastics, i.e., one or more different types of thermoplastics. Together with quantities, the quantities refer to the total amount of the correspondingly-designated type of component, as defined above.

As already mentioned, the first substrate contains at least one thermoplastic. According to the present invention, all thermoplastics that are known in the prior art and are suitable for the intended purpose can be used. Thermoplastics as described herein are plastics that can deform in a certain temperature range. For example, flexible film materials are suitable as the first substrate, including polyolefins such as polyethylene (LDPE, LLDPE, metallocene-catalyzed PE, HDPE) or polypropylene (PP, CPP, OPP), polyvinyl chloride (PVC), ethylene copolymers, such as ethylene-vinyl acetate (EVA), ethylene-acrylate copolymers (EMA), ethylene-methyl methacrylate copolymer (EMMA), ethylene-acrylic acid copolymer (EAA), polyesters, polylactides (PLAs), polyamides, and ionomers. In a preferred embodiment, the first substrate is polyethylene, polypropylene, or a mixture thereof. The film materials may also be modified, e.g., by modification of the plastic surface with functional groups. Furthermore, the first substrate may also contain other components, e.g., pigments, dyes, and/or plasticizers. In a preferred embodiment, the first substrate is a plastic having a softening temperature (as measured with DSC) under 200° C., preferably under 170° C. The softening temperature, as used herein, is the melting peak temperature (according to the standard DIN EN ISO 11357-3:2011), which can be determined by means of DSC at a heating rate of 10 K/min. Composite substrates can also be used as the first substrate. A precondition for this is that the surface to be adhesively bonded has been thermoplastically coated and the surface can be transformed by means of the application of heat into a softened state in order to have the smoothest surface possible during the adhesive bonding. A softened state, as used herein, is the state in which a change in shape of the surface of the first substrate is possible with minimal effort. The smooth surface can then be generated through the heating in step (i) and/or through the pressure during the adhesive bonding in step (iii), because the surface of the first substrate exists in a softened state and is therefore deformable. In general, the surface of the first substrate has a lower rigidity during and shortly after the heating, and is more malleable than before the heating. According to the present invention, the first substrate may be colored, colorless, or transparent films. Flexible films, as used herein, are conventional thin, film-shaped substrates that are known, for example, as a packaging film, decorative film, tape, or in similar forms. A variety of different materials may be used as the second substrate according to the present invention. In a preferred embodiment of the present invention, the second substrate has a surface that is not deformable at elevated temperature or under the method conditions. This may entail solid materials, e.g.: wood materials; metals such as aluminum, iron, or zinc; metal alloys such as bronze; thermosetting or thermoplastic plastics such as polyethylene (PE), polypropylene (PP), polyvinyl chloride (PVC), polystyrene (PS), acrylonitrile-butadiene-styrene copolymers (ABS), polyesters, or polyamides; organic polymers such as cellophane, paper, cardboard; and other materials. It may also, however, entail flexible film-shaped materials, e.g., those that were disclosed above in the context of the first substrate, which are used as the second substrate. In a preferred embodiment of the present invention, both the first substrate and the second substrate are film-shaped. Furthermore, multi-layer substrates may be used as the second substrate. Thus, the surface may be: coated, for example, with metal, oxide, or plastic coatings; printed; colored; or chemically modified. These materials may also be contained in the first substrate according to the present invention. Optionally, the surfaces of the first substrate and of the second substrate may be pretreated. For example, the plastic surfaces may be purified, and may optionally be subjected to a physical, chemical, or electrochemical pretreatment prior to the adhesive bonding.

According to the present invention, the surface to be adhesively bonded of the first substrate is heated in step (i). This may be done before or during the adhesive bonding. Then, the entire first substrate or also only the surface of the first substrate may be heated. Preferably, the heating is performed so that only the surface of the substrate is heated. According to the present invention, then, neither the mechanical properties nor the chemical composition of the first substrate are adversely affected thereby. The heating is performed by a heating device and may be performed directly onto the surface to be adhesively bonded. It is also possible to use non-contact heating methods. Methods for heating substrates and heating devices are known in the prior art, and all suitable methods and techniques may be used. The surface may be heated, for example, by contact with heated objects, e.g., a hot roller may be guided over the substrate, or by passing hot gases over. Thus, the surface may also be flamed, or a plasma treatment may be performed. In another embodiment, electromagnetic radiation is used, in the radio frequency range, in the range of microwave radiation, or in the ultrasonic range, preferably IR radiation or NIR radiation. In a preferred embodiment, the surface of the first substrate is heated by means of IR radiation with a wavelength of 1 to 10 µm, preferably 1.5 to 2 µm. It is desirable for the substrate to be heated rapidly, and only in the region of the surface to be adhesively bonded. It can thus be ensured that the mechanical properties and the chemical composition of the first substrate will be scarcely affected or unaffected. In a preferred embodiment, the adhesive bonding takes place immediately after the heating of the first substrate. With heating by ultrasound, it is desirable for the two substrates to first be brought together, and for the adhesively bonded surface to then be heated through the film substrate. The surface to be adhesively bonded of the first substrate is heated to a temperature that corresponds approximately to the softening temperature of the thermoplastic substrate. In a preferred embodiment of the present invention, the surface of the first substrate is heated to a softening temperature±40° C., preferably the softening temperature±20° C. (softening temperature as measured with DSC) of the polymer. At these temperatures, the surface of the substrate becomes soft and optionally deformable or flowable under pressure. The surface may also be smoothed without pressure, solely by the action of heating. It is known in the prior art that, depending on the polymer, this may have a narrow softening temperature, e.g., a melting point, or a softening range. The surface (reverse side) that is not to be adhesively bonded may be cooled in order to ensure that only the surface to be adhesively bonded of the first substrate is transformed into a heated state by means of heating. Cooling the reverse side of the substrate makes it possible to maintain or optionally even enhance the rigidity. This has a positive effect on the suppression of torsion and distortion in the resulting composite body. In a preferred embodiment, the cooling is performed through a cooling unit. Cooling units are known in the prior art, and all known cooling units suitable for this purpose may be used. Then, the cooling may be performed by means of liquid cooling, e.g., water cooling, or air cooling or oil cooling. Here, the coolants have a temperature that is preferably about at least 5° C. lower, preferably about at least 10° C. lower, still more preferably at least 15° C. lower than the ambient temperature. The cooling unit, as described herein, may have a variety of forms. Preferably, the cooling unit is plate-shaped. Moreover, in a preferred embodiment, the cooling unit is in direct contact with the at least one supporting conveyor belt.

The rough surface of the first substrate may be smoothed through the heating and adhesive bonding, under pressure, with the adhesive-bearing second substrate. This makes it possible to have an especially low layer thickness of the applied adhesive between the substrates, and, moreover, a full-surface adhesive bonding. Depending on the surface condition of the first substrate, the softening temperature of the first substrate, and the generated surface temperature of the first substrate, the surface of the first substrate may already be smoothed by the heating, without pressure.

According to the present invention, in step (i), the first substrate is transported by means of at least one supporting conveyor belt through a heating zone. The deformation, in particular, the stretching of the first substrate is caused during the method, inter alia, by the heating in combination with the stress that is located in the first substrate. This makes it possible for the first substrate to deform, in particular, stretch, preferably in the direction of the process line, which results then in twisting and distortion of the composite body that is obtained. The at least one supporting conveyor belt according to the present invention supports and stabilizes the first substrate and prevents deformations, in particular, stretching, in all three spatial directions. The deformation may also be caused by gravity. The at least one supporting conveyor belt is arranged ahead of the place of the adhesive bonding in the process direction, i.e., ahead of the roller assembly, and in the operating area of the heating device, and can preferably be adapted to the adhesive bonding rate in step (iii) of the method. Furthermore, the at least one conveyor belt as described herein may be guided via two rollers. The at least one conveyor belt according to the present invention is elastic and durable, in particular, tear-resistant and abrasion-resistant. Moreover, the at least one supporting conveyor belt must have a temperature resistance of more than 150° C., preferably more than 200° C., still more preferably more than 250° C., most preferably more than 300° C. Suitable materials for the at least one conveyor belt are, for example, elastic woven or knitted fabric from natural and/or synthetic fibers. Essentially all materials known to a person skilled in the art and suitable for the entire purpose can be used, for example, polymers such as polyamide, in particular, aromatic polyamides (aramids) such as poly(p-phenylenterephthalamide) (PPTA), Kevlar® or Nomex®, polyesters, in particular, thermoplastic copolyesters, polyisoprene, polystyrene butadiene, polyisobutylene isoprene, polyacrylonitrile butadiene, polyvinyl chloride (PVC), natural rubber, silicone rubber, thermoplastic polyurethane, or mixtures thereof.

Optionally, other materials may also be added, such as, for example, inorganic fillers, in order to increase the temperature resistance of the belt. For example, conveyor belts made of rubber may contain carbon black as a filler. Glass and carbon fibers are also suitable as fillers.

Generally, the at least one conveyor belt may include textile and/or wire-cable reinforcements, which transfer tensile forces. The at least one conveyor belt may also be a round wire mesh belt, in a variety of embodiments.

In a variety of embodiments of the present invention, the at least one conveyor belt may have openings, for example, may be perforated. Such openings may make it easier to cool the side not to be adhesively bonded, or make it possible to apply a negative pressure, which improves the support effect.

According to the present invention, the at least one supporting conveyor belt is, in particular, thermally conductive. This is especially advantageous for the cooling of the side not to be adhesively bonded. Both the construction and the operation of such conveyor belts are known in the prior art. In a preferred embodiment of the present invention, the at least one supporting conveyor belt is guided during the method with 1.0 to 1.1 times, preferably 101 to 1.10 times the speed of the second substrate. This slightly-increased speed of the at least one conveyor belt suppresses the deformation, in particular, the stretching in the direction of the process line, so that the first substrate does not stretch or scarcely stretches and the resulting product is therefore not twisted or distorted.

In step (ii) of the method according to the present invention, the first substrate is brought together with a second substrate. The second substrate is coated with an adhesive. This adhesive may, in a preferred embodiment of the present invention, be applied in an additional method step to the second substrate, preferably in parallel to step (i). If necessary, the second substrate may also run through the step (i) of the method before the adhesive has been applied. The adhesive may be applied through a method that has been established in the prior art, e.g., by spraying, wetting, doctoring, rolling, printing, or other known methods. According to the present invention, the adhesive is applied, in particular, with a coating weight of 0.01 to 4 g/m$^2$, preferably 0.01 to 1.5 g/m$^2$, preferably 0.01 to 1 g/m$^2$, and still more preferably 0.01 to 0.7 g/m$^2$. The adhesive may be adapted to the requirements of the adhesive bonding. Should aqueous adhesives be used, it is desirable for the water to be drained from the surface. Should solvent-containing adhesives be selected, the surface is resistant to the solvent used. Should hot-melt adhesives be selected, the substrate is chosen so that the surface is not affected by the possible application of heat. Reactive adhesives may optionally impart an improved adhesion to the substrate. Should radiation-crosslinking adhesives be used, the adhesive layer may preferably be irradiated before the substrates are brought together, in order to obtain crosslinking. The adhesive is preferably selected from the group consisting of thermoplastic adhesives, crosslinkable adhesives, and mixtures thereof in solvent-containing, aqueous, or solvent-free form. Both the method and the device according to the present invention may comprise additional appropriate method steps, where necessary, so as to adapt to the adhesive, such as drying steps, heating steps, or other supportive method steps, or respectively units through which these method steps are feasible. For the method according to the present invention, a suitable adhesive made of application-ready adhesives, which may be liquid, may be used. This may then entail aqueous dispersions, solvent-containing non-reactive or reactive adhesives, or solvent-free, liquid, or solid, meltable adhesives. Moreover, the adhesive may be a one-component system or a two-component system. Examples of suitable adhesives are those based on thermoplastic polymers, such as polyurethanes, ethylene vinyl acetate, polyacrylates, solvent-containing adhesives such as acrylate adhesives, or one-component or two-component polyurethane adhesives, silane-crosslinked adhesives, reactive hot-melt adhesives such as one-component PU adhesives, or solvent-free one-component or two-component PU adhesives, silane systems, or radiation-crosslinkable adhesives. According to the present invention, it is desirable for the adhesive to have a low viscosity. The viscosity of a suitable adhesive when applied is, for example, up to 10,000 mPa·s, preferably up to 5,000 mPa·s (as measured with a Brookfield viscometer, ISO 2555). The measurement temperature was adapted to the application temperature. For adhesives that are liquid at room temperature, the viscosity is determined, for example, at 20° C. to 40° C., while the measurement temperature for hot-melt adhesives may be 100° C. to 150° C. With higher-viscosity adhesives, measurement may also be taken, for example, at 40° C. to 100° C. Aqueous or solvent-containing adhesives often have a low viscosity, up to 500 mPa·s, while hot-melt adhesives often have a viscosity of over 1,000 mPa·s.

In step (iii) of the method according to the present invention, the first substrate and the second substrate are adhesively bonded by pressure. Joining with the heated surface of the first substrate may also cause the thin adhesive layer to be heated. This may lead to quicker adhesion and to quicker crosslinking. Extensive adhesive bonding is achieved through the adhesive bonding by pressure, despite the small amount of adhesive used. All devices known to a person skilled in the art may be used to bring together and adhesively bond, such as, for example, stamps, rolls, rollers, and/or plates, in particular, through pressing or rolling. Depending on the substrates and the pretreatment, in particular, the surface temperature of the first substrate, the pressure of the weight of the first or second substrate itself may be sufficient to perform the adhesive bonding. The pressure on the substrates may be, for example, between 0.2 and 15 bar. When two film substrates are being adhesively bonded, laminating devices that can be used therefor have been established in the prior art. According to the present invention, a roller assembly is used for the adhesive bonding in step (iii) of the method. A roller assembly as used herein comprises two rollers, wherein these rollers rotate in opposite directions and exert pressure on and press together the materials—in this case, the two substrates—located therebetween.

In another preferred embodiment, the resulting composite rests on at least one other supporting conveyor belt after having been adhesively bonded in step (iii). The at least one conveyor belt may be a part of the device according to the present invention and bears the produced composite away from the roller assembly. This at least one conveyor belt contributes to suppressing the twisting and distortion of the resulting composite body, in particular, in the cooling down after the steps (i) to (iii) in the method according to the present invention.

The method according to the present invention may entail both a batch process and a continuous method, preferably a continuous method. Furthermore, it should be noted here that according to the method according to the present invention, adhesive bonding can be performed in a wide range of applications. Where solid substrates are being adhesively bonded to film-shaped substrates, the adhesive is applied to the optionally pretreated solid substrate. The first substrate, with a surface made of thermoplastic polymers, is applied to the thus-coated surface. The heating of the surface of the first substrate, which contains at least one thermoplastic, softens same on the surface. Use of pressure in the adhesive bonding makes it possible to ensure that an especially smooth surface of the thermoplastic substrate to be adhesively bonded is obtained. Air bubbles were not trapped during the method according to the present invention. The resulting product was not prone to delamination. Another embodiment uses a flexible second substrate onto which a thin layer of an adhesive is applied. A film substrate having a layer of thermoplastic polymers on the surface is also applied to this surface under pressure. Heating and adhesively bonding with the first substrate also ensures that an especially smooth surface of the first substrate is obtained.

Another subject matter of the present invention is a composite body obtained according to the method described herein. This composite body comprises a first substrate containing a thermoplastic, a second substrate, and an adhesive layer located therebetween, wherein this adhesive layer has a thickness of 0.01 to 4 µm. The layer thickness can be adjusted through the weight of adhesive applied to the surface, for example, from 0.01 to 4 g/m$^2$. Then, the second substrate may be a rigid or solid substrate, for example, a molding made of a variety of materials having a low surface roughness. As another embodiment, the second substrate may be composed of a flexible substrate. The material and properties of this flexible substrate can then be varied within wide limits. The material may also, however, be the same as that of the first substrate. The second substrate may optionally also be machined or printed. Applying a thin adhesive layer does not affect or alter the surface of the second substrate. Possible water or organic solvent content in the adhesive applied is selected so that the properties of the surface of the first substrate are essentially unaffected. The composite substrates according to the present invention have a high strength of the adhesively-bonded individual substrates. The low layer thickness of the adhesive layer ensures a high cohesion of the adhesive. Furthermore, the low layer thickness yields an improved flexibility of the adhesive layer. For this reason, composite substrates according to the present invention may have a high stability against elastic deformation. Another advantage of the method according to the present invention and the composite body produced thereby is found in the low visual change in the surfaces.

Having a thin adhesive layer allows for same to be scarcely noticeable and colorless, and allows for the visual properties of the composite object to be improved or maintained. Another advantage of the method according to the present invention lies in the lower loads in the production process. Due to the low solvent and water content and the low heating temperature, the properties of the different substrates are not affected. For example, small amounts of water are advantageous for paper substrates. Small amounts of solvent are also desirable for substrates that are optionally sensitive to solvents, irrespective of occupational hygiene. Having a low layer thickness also causes the surface of the first substrate to be only slightly thermally stressed when a hot-melt adhesive is applied. Furthermore, the brief heating of the second substrate does not produce a load on the first substrate. In a preferred embodiment, the second substrate is selected from the group consisting of paper, metal, plastic, or multilayer substrates. In another preferred embodiment, the composite body is a flexible, multilayer film.

Another subject matter of the present invention is a device for adhesively bonding a first substrate and a second substrate, the device comprising at least one supporting conveyor belt in order to transport a first substrate, a heating device in order to soften the surface of the substrate transported by means of the at least one conveyor belt, and a roller assembly in order to bring together and adhesively bond the softened first substrate with the second substrate.

The at least one conveyor belt, as described herein, is guided via at least two rollers or rolls. FIG. 1 illustrates a preferred embodiment of the present invention. Here, the at least one supporting conveyor belt (104) is guided via a roller (102) of the roller assembly (101, 102) and another roller (103). In one embodiment, a roller around which the at least one supporting conveyor belt (104) runs is a roller of the roller pair (101, 102) that adhesively bonds the first substrate (105) and the second substrate (106). In another embodiment illustrated in FIG. 2, the at least one conveyor belt (204) runs around at least two rollers (203, 210), wherein the one roller (210) around which at least one conveyor belt (204) runs is arranged directly before the roller pair (201, 202), which adhesively bonds the two substrates (205, 206) to one another in step (iii) of the method, such that the first substrate (205) can arrive at the roller pair (201, 202) after the transport through the heating zone.

The at least one supporting conveyor belt (104, 204) on which the first substrate (105, 205) can be rested and which serves to transport the first substrate through the heating zone is mounted in the operating area of the heating device (108, 208). The heating device (108, 208) is located at such a distance from the conveyor belt (104, 204) that the surface of the first substrate (105, 205) can be heated in a manner according to the present invention.

In another embodiment, on the side of the at least one supporting conveyor belt (104, 204) on which the first substrate (105, 205) can be laid, there is a cooling unit (107, 207), so that the belt (104, 204) is surrounded by the heating device (108, 208) and the cooling unit (107, 207). The cooling unit (107, 207) is plate-shaped in one embodiment of the present invention. In another embodiment, the cooling unit (107, 207) may be in direct contact with the at least one supporting conveyor belt, so that the at least one conveyor belt (104, 204) is guided past and touches the cooling unit (107, 207). This is advantageous for the heat transfer from the at least one conveyor belt (104, 204) to the cooling unit (107, 207) on the reverse side of the first substrate (105, 205). In another embodiment, the device according to the present invention comprises at least one additional supporting conveyor belt, which is arranged behind the roller assembly (101, 102, 201, 202) of the device according to the present invention in the process direction, and supports the composite body (109, 209) that is produced. This suppresses deformation of the composite body (109, 209). A roller assembly as used herein comprises two rollers, wherein these rollers rotate against one another and exert pressure on and press together the materials—in this case, the two substrates—located therebetween.

In another embodiment illustrated in FIG. 3, the device has two conveyor belts (311, 312) on which the first substrate can be laid and via which rollers (303, 310) are guided. The rollers (303, 310) are located in front of the roller assembly (301, 302) in the process direction. Furthermore, the device has, below the conveyor belts (311, 312), a suction device (313) that brings about an improved fixation of the first substrate and counteracts unintentional displacement, for example, slipping, during the method. Furthermore, the suction device (313) can prevent the first substrate from slipping off of the conveyor belts (311, 312), e.g., through the action of gravity when the conveyor belts (311, 312) are in an inclined position.

BRIEF DESCRIPTION OF THE DRAWINGS

FIG. 3 illustrates one embodiment in which the device has two conveyor belts (311, 312) on which the first substrate can be laid and via which rollers (303, 310) are guided.

Figure 1:
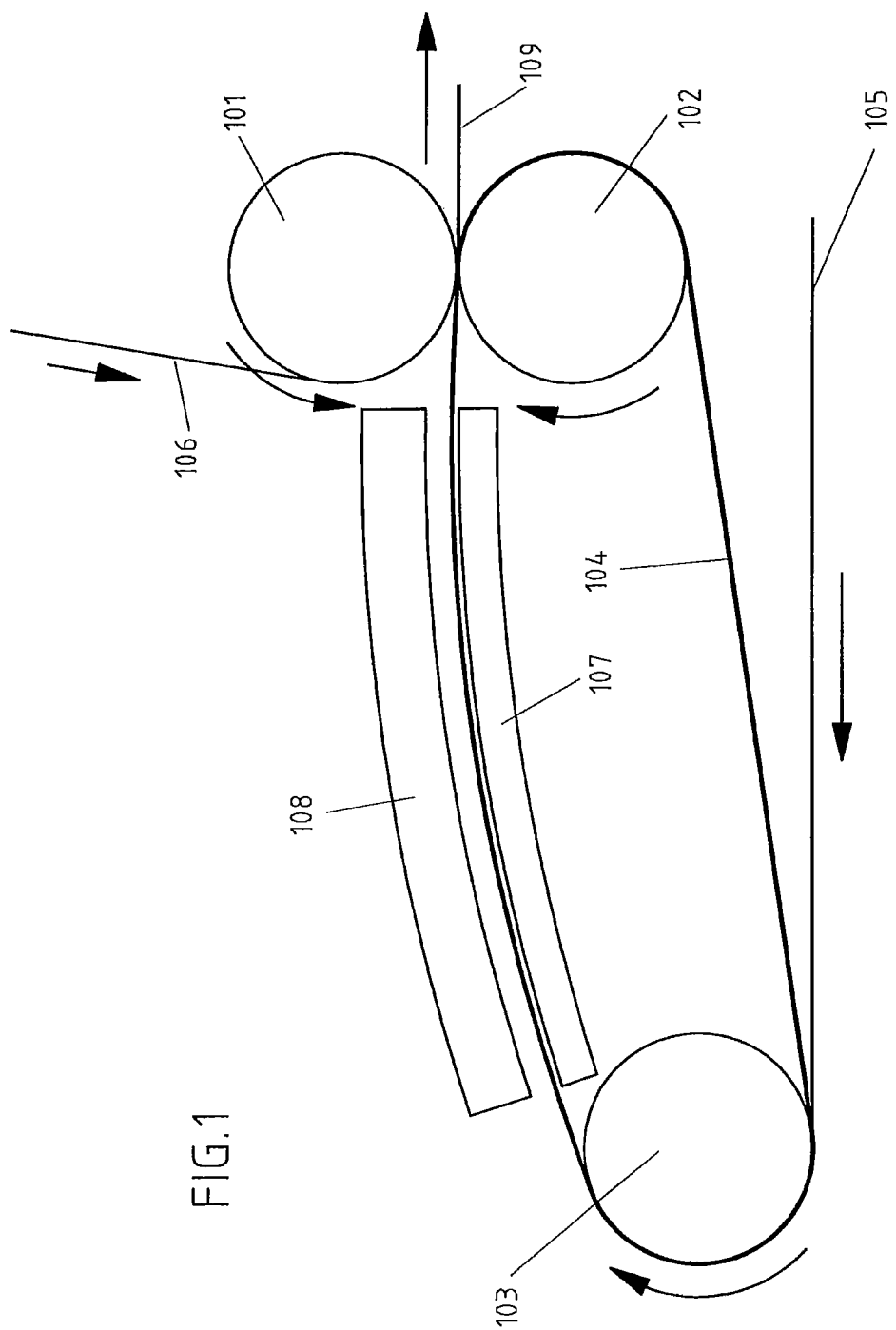
FIG. 1 illustrates one embodiment in which the at least one supporting conveyor belt (104) is guided via a roller (102) of the roller assembly (101, 102) and another roller (103).
Figure 2:
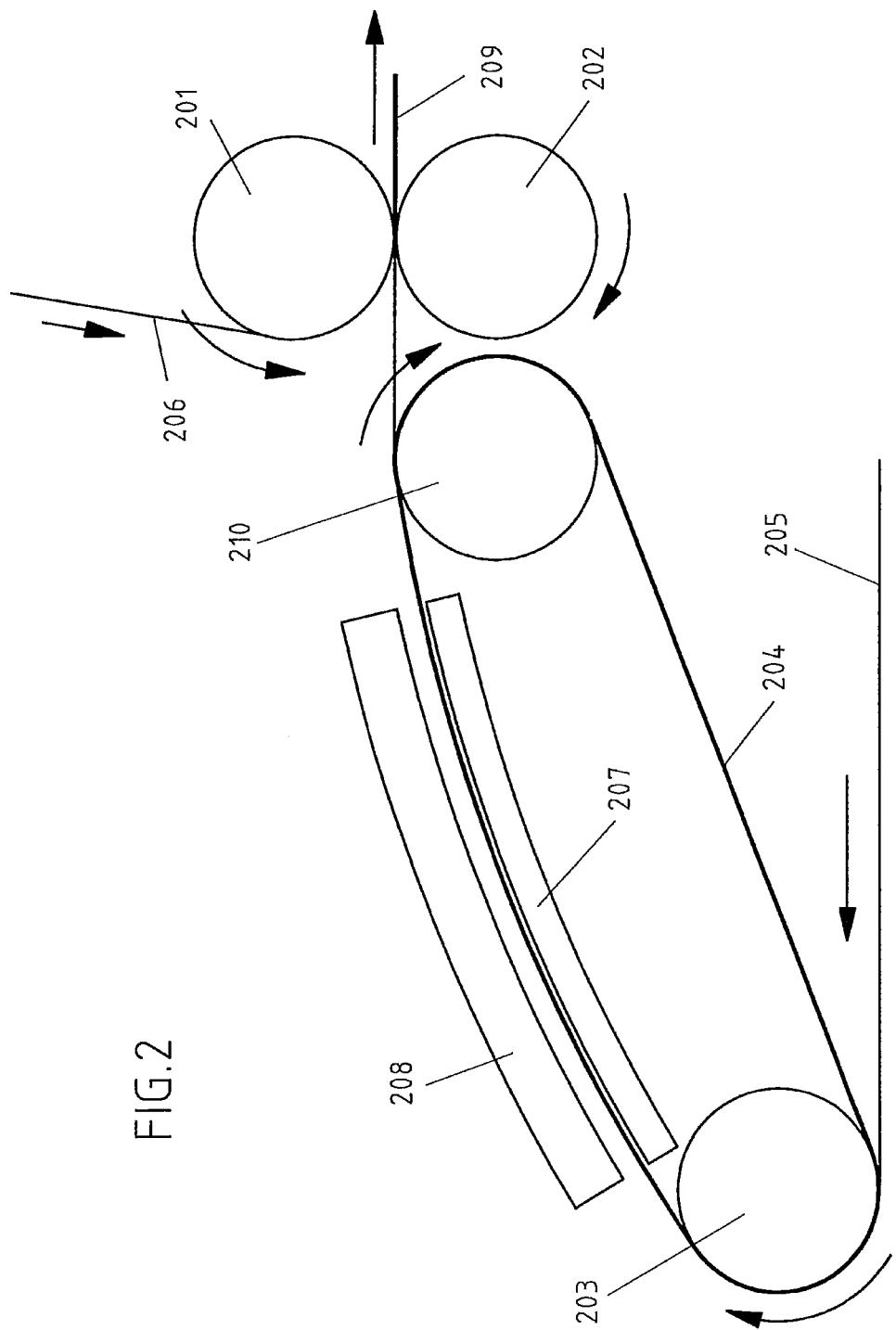
FIG. 2 illustrates one embodiment in which the at least one conveyor belt (204) runs around at least two rollers (203, 210), wherein the one roller (210) around which at least one conveyor belt (204) runs is arranged directly before the roller pair (201, 202).

The invention claimed is:

1. A method for adhesively bonding two substrates, the method comprising:
    transporting a first film-shaped substrate comprising at least one thermoplastic on at least one supporting conveyor belt through a heating zone in which the substrate is heated so that a surface of the first film-shaped substrate is transformed into a softened state; wherein a first side of the at least one conveyor belt is cooled by a cooling unit, while the first film-shaped substrate is supported and heated on a second side of the at least one conveyor belt;
    bringing the first film-shaped substrate during and/or immediately after the heating together with a second substrate, wherein a surface of the second substrate has been coated with an adhesive at a coating weight of 0.01 to 4 g/m$^2$; and
    adhesively bonding the two substrates by pressure.

2. The method according to claim 1, wherein the method comprises coating the second substrate with an adhesive with a coating weight of 0.01 to 4 g/m$^2$ during the transporting of the first film-shaped substrate through the heating zone.

3. The method according to claim 1, wherein the substrates, having been adhesively bonded to one another, are guided over at least one supporting conveyor belt during and/or after adhesively bonding the two substrates by pressure.

4. The method according to claim 1, wherein the at least one supporting conveyor belt has a temperature resistance of more than 200° C.

5. The method according to claim 1, wherein the at least one supporting conveyor belt has 1.0 to 1.1 times the speed of the second substrate.

6. The method according to claim 1, wherein
    the first film-shaped substrate is a plastic film having a softening temperature under 200° C.; and/or
    the first film-shaped substrate is polyethylene, polypropylene, or a mixture thereof.

7. The method according to claim 1, wherein the adhesive is selected from the group consisting of thermoplastic adhesives, crosslinkable adhesives, and mixtures thereof in solvent-containing, aqueous, or solvent-free form.

8. The method according to claim 1, wherein the first film-shaped substrate is heated with at least one of plasma treatment, laser treatment, flame treatment, ultrasound, or infrared irradiation.

9. The method according to claim 1, wherein the heating is performed at a temperature in the range of +40° C. to 40° C. of the softening temperature of the first film-shaped substrate.

10. The method according to claim 1, wherein the surface of the second substrate is not in a softened state at the heating temperature.

11. The method according to claim 1, wherein the first film-shaped substrate and the second substrate are film-shaped.

12. A composite body obtained by the method of claim 1.

13. The composite body according to claim 12, wherein the first film-shaped substrate is a flexible thermoplastic plastic film and the second substrate is selected from the group consisting of paper, metal, plastic, or multilayer substrates.

14. The composite body according to claim 12, wherein the composite body is a multilayer flexible film.

15. A method for adhesively bonding two substrates, the method comprising:
    transporting a first film-shaped substrate comprising at least one thermoplastic on at least one supporting conveyor belt through a heating zone in which the substrate is heated so that a surface of the first film-shaped substrate is transformed into a softened state;
    bringing the first film-shaped substrate together with a second substrate, wherein a surface of the second substrate has been coated with an adhesive at a coating weight of 0.01 to 4 g/m$^2$; wherein the second substrate avoids the heating zone; and
    adhesively bonding the two substrates by pressure.

16. A method for adhesively bonding two substrates, the method comprising:
    transporting a first film-shaped substrate comprising at least one thermoplastic on at least one supporting conveyor belt through a heating zone in which the substrate is heated so that a surface of the first film-shaped substrate is transformed into a softened state;
    bringing the first film-shaped substrate together with a second film-shaped substrate comprising at least one thermoplastic, wherein a surface of the second substrate has been coated with an adhesive at a coating weight of 0.01 to 4 g/m$^2$, during and/or immediately after the heating; and
    adhesively bonding the two substrates by pressure.

* * * * *